United States Patent
Knobel et al.

(10) Patent No.: US 10,870,367 B2
(45) Date of Patent: Dec. 22, 2020

(54) SWITCHABLE STORAGE SYSTEM FOR A VEHICLE

(71) Applicant: Bayerische Motoren Werke Aktiengesellschaft, Munich (DE)

(72) Inventors: Christian Knobel, Munich (DE); Gerhard Hofer, Munich (DE); Daniel Gleyzes, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 125 days.

(21) Appl. No.: 16/172,235

(22) Filed: Oct. 26, 2018

(65) Prior Publication Data
US 2019/0061551 A1 Feb. 28, 2019

Related U.S. Application Data

(63) Continuation of application No. PCT/EP2017/053203, filed on Feb. 14, 2017.

(30) Foreign Application Priority Data

Apr. 28, 2016 (DE) .......... 10 2016 207 272

(51) Int. Cl.
*B60L 58/19* (2019.01)
*H02J 7/00* (2006.01)
*B60L 58/22* (2019.01)

(52) U.S. Cl.
CPC .............. *B60L 58/19* (2019.02); *B60L 58/22* (2019.02); *H02J 7/0024* (2013.01); *H02J 7/0014* (2013.01); *Y02T 10/70* (2013.01)

(58) Field of Classification Search
CPC ......... H02J 7/0014–0019; H02J 7/0024; H02J 7/342; B60L 58/19; B60L 3/0046
See application file for complete search history.

(56) References Cited

U.S. PATENT DOCUMENTS 3,286,152 A * 11/1966 Noe ...................... H02J 7/0024
320/117
4,277,737 A 7/1981 Mueller-Werth
(Continued)

FOREIGN PATENT DOCUMENTS

DE 27 40 438 A1 3/1979
DE 100 06 420 A1 8/2000
(Continued)

OTHER PUBLICATIONS

Machine Translation of JP-2010011522-A (Year: 2020).*
(Continued)

*Primary Examiner* — David V Henze-Gongola
(74) *Attorney, Agent, or Firm* — Crowell & Moring LLP

(57) ABSTRACT

A storage system provides electrical power for driving a vehicle. The storage system has a first and a second storage module for storing electrical energy. The storage system includes a switching unit which is configured for connecting the first storage module and the second storage module in series for a charging operation and in parallel for driving the vehicle. The storage system includes a control unit which is configured to implement measures in order to reduce a difference between a state of charge of the first storage module and a state of charge of the second storage module in preparation for a parallel connection of the first storage module to the second storage module.

11 Claims, 3 Drawing Sheets

(56) References Cited

U.S. PATENT DOCUMENTS

| | | | | |
|---|---|---|---|---|
| 5,225,761 | A * | 7/1993 | Albright | H02J 7/1423 |
| | | | | 320/117 |
| 6,351,097 | B1 | 2/2002 | Oh | |
| 2003/0087148 | A1* | 5/2003 | Minamiura | H01M 10/6563 |
| | | | | 429/62 |
| 2007/0139012 | A1 | 6/2007 | Hayashigawa | |
| 2008/0054327 | A1 | 3/2008 | Johnson | |
| 2009/0102422 | A1* | 4/2009 | Naganuma | H02J 7/0014 |
| | | | | 320/118 |
| 2009/0107743 | A1* | 4/2009 | Alston | H02J 7/342 |
| | | | | 180/65.21 |
| 2010/0207579 | A1 | 8/2010 | Lee et al. | |
| 2011/0127964 | A1* | 6/2011 | Nishida | H01M 10/441 |
| | | | | 320/118 |
| 2012/0007557 | A1 | 1/2012 | Hayashigawa | |
| 2012/0248868 | A1* | 10/2012 | Mobin | B60L 53/63 |
| | | | | 307/9.1 |
| 2013/0026991 | A1 | 1/2013 | Roessler | |
| 2013/0300369 | A1* | 11/2013 | Butzmann | B60L 50/52 |
| | | | | 320/116 |
| 2014/0111160 | A1 | 4/2014 | Nozawa | |
| 2016/0072414 | A1* | 3/2016 | Chuang | H02P 9/00 |
| | | | | 318/139 |

FOREIGN PATENT DOCUMENTS

| | | |
|---|---|---|
| DE | 10 2012 213 074 A1 | 1/2013 |
| DE | 10 2014 004 790 A1 | 10/2015 |
| DE | 10 2015 016 980 A1 | 8/2016 |
| DE | 10 2015 214 732 A1 | 2/2017 |
| JP | 2002-171675 A | 6/2002 |
| JP | 2010011522 A * | 1/2010 |
| JP | 2011-61920 A | 3/2011 |

OTHER PUBLICATIONS

International Search Report (PCT/ISA/210) issued in PCT Application No. PCT/EP2017/053203 dated May 26, 2017 with English translation (seven pages).

German-language Written Opinion (PCT/ISA/237) issued in PCT Application No. PCT/EP2017/053203 dated May 26, 2017 (seven pages).

German-language Search Report issued in counterpart German Application No. 10 2016 207 272.2 dated Dec. 20, 2016 with partial English translation (13 pages).

* cited by examiner

SWITCHABLE STORAGE SYSTEM FOR A VEHICLE

CROSS REFERENCE TO RELATED APPLICATIONS

This application is a continuation of PCT International Application No. PCT/EP2017/053203, filed Feb. 14, 2017, which claims priority under 35 U.S.C. § 119 from German Patent Application No. 10 2016 207 272.2, filed Apr. 28, 2016, the entire disclosures of which are herein expressly incorporated by reference.

BACKGROUND AND SUMMARY OF THE INVENTION

The invention relates to a storage system for an at least partially electrically-propelled vehicle. Specifically, the invention relates to a storage system having a flexible storage capacity, which can be charged with relatively high charging capacities.

In electrically-propelled vehicles, e.g. in PHEV vehicles (plug-in hybrid electric vehicles), or in exclusively electrically-operated vehicles (BEV, or battery electric vehicles), at present, a composite energy store comprised of one or more individual battery cells or storage cells is employed as an energy source. The battery cells are generally individual lithium-ion cells. These are mutually connected in series, or in a combination of series and parallel circuits. The total number of battery cells thus determines the available energy, and consequently the range of an electrically-propelled vehicle.

The charging of an energy store of this type is typically executed by means of the connection to an external charging station, which is connected to a power supply grid. The available power input (charging capacity) for the charging of the energy store can thus be dependent upon the charging station. The charging by use of DC can be described as rapid charging, with a charging capacity of 50 kW or more. A charging by use of AC permits charging capacities in the region of 3.6 kW up to 22 kW.

High charging capacities are advantageous in order to avoid the prolonged immobilization of a vehicle for the recharging of the energy store. DC charging, with an increased charging voltage (of e.g. 800 V or more, as opposed to the present value of 460 V or less), provides one option for increasing the charging capacity. However, the application of a higher charging voltage necessitates changes to the HV (high-voltage) storage technology employed. In general, the use of energy stores with correspondingly raised rated voltages is not desirable (e.g. on the grounds of the IGBTs of an inverter which is employed in the drive train, which can only be used up to specific maximum limiting voltages (for example 650 V, 900 V or 1,200 V)).

DE10 2014 004790 A1 describes an energy store for a vehicle, in which a changeover matrix is employed for the serial interconnection of parallel-connected strings in the energy store, such that the voltage level of the energy store is doubled (where two parallel-connected strings are employed). Thus, in a drive mode, an unchanged drive voltage (e.g. of 400 V) and, in a charging mode, an increased charging voltage (e.g. of 800 V) are employed.

DE10 2014 004790 A1 describes namely the concept of a storage system having a changeover matrix. This does not guarantee, however, that the changeover between the charging mode and the driving mode of the storage system can be executed in a reliable manner.

The present document addresses the technical issue of the provision of a switchable storage system, which can change over between a charging mode and a drive mode in a reliable and energy-efficient manner.

According to one aspect, a storage system for the provision of electric power for the propulsion of a vehicle is described. Specifically, the electric power can be used to operate an electrical drive machine of the vehicle. Moreover, during braking processes, electric power can be, if necessary, recovered by the electrical machine of the vehicle and stored in the storage system.

The storage system includes a first and a second storage module for storing electrical energy. In general, the storage system can have N storage modules for the storage of electrical energy, where N>1. Each storage module can thus have at least one string of (typically a plurality) of storage cells. Where applicable, a storage module can also have parallel-connected storage cells. The number N of storage modules is a whole number, and preferably an even number, where N>1. Preferably, N can be equal to 2, whereby an advantageous compromise between the charging voltage (for the charging of the storage system) and the drive voltage (for the operation of the drive system of the vehicle) is achieved (specifically with respect to the power transistors which are installed in the vehicle). The N storage modules can be of identical design (specifically with regard to the respective rated voltage and/or with regard to the respective storage capacity).

The storage system further includes a switching unit (having a plurality of switches) which is designed to connect the N storage modules in series, for a charging mode, and to connect the N storage modules in parallel for the propulsion of the vehicle, i.e. for the supply of the drive system of the vehicle.

The storage system further includes a control unit, which is designed to control the switching unit. The control unit can be designed to actuate the switching unit such that, for the execution of a charging process, the series circuit of the N storage modules is connected in parallel with a charging socket of the vehicle, by which the storage system can be connected to an external charging station. A relatively rapid charging process, with a relatively high charging voltage, can be executed accordingly. In a corresponding manner, the control unit can be designed to actuate the switching unit such that, for the propulsion of the vehicle, at least a proportion of the N storage modules (e.g. N/2 storage modules) is connected in parallel with the drive system of the vehicle. A secure operation of the vehicle with a relatively low drive voltage can be achieved accordingly.

The control unit can be designed to implement one or more measures in order to reduce a difference of a state of charge (e.g. SOC) of the first storage module and a state of charge of the second storage module, in preparation for a parallel connection of the first storage module to the second storage module. By means of a reduction in the difference between the states of charge of the N storage modules, a secure changeover from a series circuit connection (for the charging of the storage modules) to a parallel circuit connection (for the propulsion of the vehicle) can be achieved. A storage system can thus be provided which, in a reliable manner, permits high charging capacities and a cost-effective drive operation.

The control unit can be designed to determine information with regard to the state of charge of the first storage module and with regard to the state of charge of the second storage module. The information with regard to the states of charge can be determined e.g. by the measurement of a (no-load) voltage on the first storage module and/or on the second storage module. Alternatively or additionally, the information with regard to the states of charge can be determined by the measurement of the cumulative charging capacities of the first storage module and/or of the second storage module over time. The one or more measures can then be implemented by the control unit, in accordance with the information with regard to the states of charge. Specifically, differences in the state of charge indicated by the information can be reduced.

The storage system can include a first (electrically operated) cooling module, and a second (electrically operated) cooling module. Specifically, the cooling modules can respectively comprise an electric coolant compressor. The first cooling module can thus be arranged (where applicable, exclusively) to cool the first storage module. The second cooling module can be arranged (where applicable, exclusively) to cool the second storage module. Specifically, over 50% of the thermal energy generated by the first cooling module can be taken up by the first storage module. Analogously, over 50% of the thermal energy generated by the second cooling module can be taken up by the second storage module.

The first cooling module can (where applicable, exclusively) be operated by electrical energy from the first storage module, and the second cooling module can (where applicable, exclusively) be operated by electrical energy from the second storage module. Thus, by the operation of the first cooling module for the first storage module, the state of charge of the first storage module can be influenced. By the operation of the second cooling module for the second storage module, in turn, the state of charge of the second storage module can be influenced. In an analogous manner, corresponding N cooling modules can be provided for N storage modules.

The control unit can be designed to adjust the electrical consumption of the first cooling module and of the second cooling module, such that the difference between the state of charge of the first storage module and the state of charge of the second storage module is reduced. For example, the first cooling module can be operated with a higher electrical capacity than the second cooling module, if the state of charge of the first storage module is higher than the state of charge of the second storage module. By the state of charge-dependent actuation of the cooling modules, an effective reduction of differences in states of charge can be achieved.

The storage system can include a DC voltage converter, which is designed to move electrical energy between the first storage module and the second storage module. Specifically, electrical energy can be taken from the first storage module, which is employed for the charging of the second storage module (or vice versa). The control unit can be designed to actuate the DC voltage converter, such that the difference between the state of charge of the first storage module and the state of charge of the second storage module is reduced. For example, electrical energy can be transferred from the first storage module for the charging of the second storage module, if the first storage module has a higher state of charge than the second storage module. By the employment of a DC voltage converter, a reliable reduction of differences in states of charge can be achieved.

Alternatively or additionally, the DC voltage converter can be employed for the charging of a low-voltage on-board network (e.g. a 12 V on-board network) of the vehicle (specifically a low-voltage battery of the vehicle) with energy from the first or second storage module. Specifically, electrical energy can be taken from the storage module having the respectively higher state of charge. The state of charge of a storage module can thus be reduced, in order to reduce the difference in the state of charge between the two storage modules.

The control unit can be designed to actuate the switching unit such that, in a first phase of a charging process, the first storage module and the second storage module are mutually arranged in series and, in combination, are arranged in parallel with a charging socket of a vehicle. In the first phase of the charging process, charging can thus be executed with a relatively high charging voltage (corresponding e.g. to double the rated voltage of the two storage modules).

The control unit can further be designed to actuate the switching unit such that, in a subsequent second phase of the charging process, the first storage module is disconnected from the charging socket of the vehicle and the second storage module is arranged in parallel with the charging socket of the vehicle. In the second phase of the charging process, specifically, a dedicated recharging of the second storage module can be executed. Specifically, the state of charge of the second storage module can thus be increased, in order to reduce the difference in the state of charge to the first storage module. An efficient reduction of differences in state of charge can thus be achieved.

The control unit can be designed to actuate the switching unit such that, in a first phase of a drive mode of the vehicle (specifically, immediately following a charging process), the second storage module is disconnected from a drive system of the vehicle, and the first storage module is arranged in parallel with the drive system. Consequently, during the first phase of the drive mode, no power for the propulsion of the vehicle is taken from the second storage module. Conversely, electrical energy is taken from the first storage module for the propulsion of the vehicle. Consequently, the state of charge of the first storage module is reduced, and can thus be adjusted to the (lower) state of charge of the second storage module.

The control unit can be designed to further actuate the switching unit such that, in a subsequent second phase of the drive mode, additionally, the second storage module is arranged in parallel with the drive system. This can specifically be achieved, if the difference between the state of charge of the first storage module and that of the second storage module has been sufficiently reduced (in order to prevent substantial compensating currents). An efficient reduction of differences in state of charge can thus be achieved.

The control unit can be designed to determine a switching timepoint, at which the take-up of power from the storage system by the drive system of the vehicle is lower than or equal to a predefined power threshold value. Specifically, a switching timepoint can be determined, at which the drive system is in zero power mode (e.g. during a coasting phase in drive mode). The control unit can then cause the switching unit to arrange the second storage module at the switching time point, in parallel with the drive system. A reliable switching-on of the second storage module can thus be ensured.

According to a further aspect, a method is described for protecting a storage system of a vehicle. The storage system includes a first and a second storage module for the storage of electrical energy. The method includes the arrangement of the first storage module and the second storage module in series, in order to charge the first storage module and the second storage module. The method further includes, in preparation for a parallel connection of the first storage module and the second storage module, the execution of one or more measures for the reduction of a difference of the states of charge of the first storage module and of the second storage module. The method further includes the mutually parallel arrangement of the first storage module and the second storage module, in order to supply electrical energy to a drive system of the vehicle.

The method can include the determination of historic data which indicate a difference of the states of charge of the first storage module and of the second storage module in the course of one or more previous charging processes of the first and second storage modules. For example, the historic data can indicate the magnitude of the difference between the states of charge of the two storage modules following the completion of a previous serial charging process. The one or more measures for the reduction of the current difference in state of charge can then be selected in accordance with the historic data. Thus, for example, the time required for the adjustment of the states of charge can be reduced.

According to a further aspect, a vehicle (specifically a road vehicle, e.g. a private car, a heavy goods vehicle or a motorcycle) is described, which includes the storage system described in the present document.

It should be observed that the methods, devices and systems described in the present document can be applied in isolation, or in combination with other methods, devices and systems described in the present document. Moreover, any aspects of the methods, devices and systems described in the present document can be mutually combined in a variety of ways. Specifically, the characteristics disclosed in the claims can be mutually combined in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
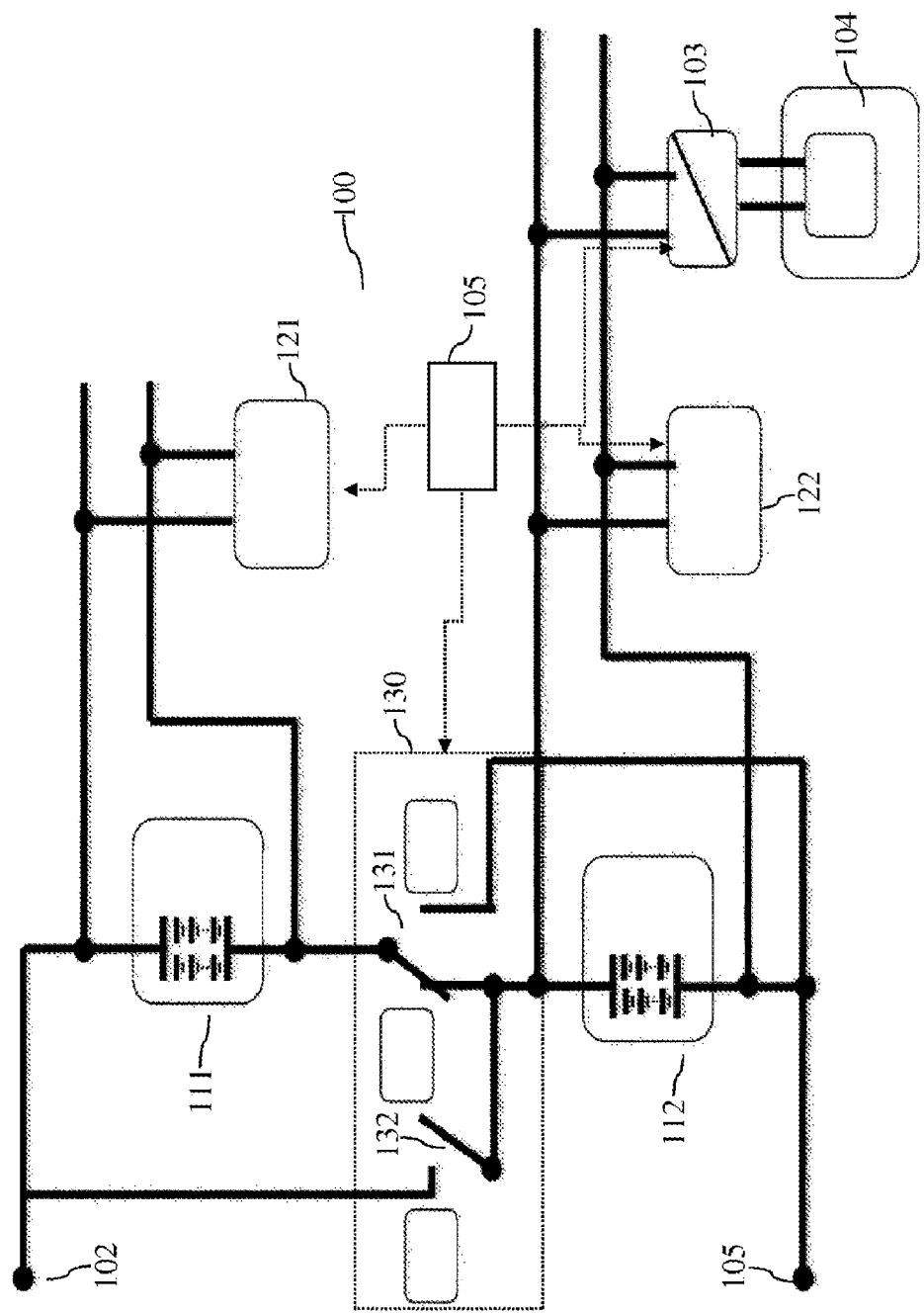
FIG. 1 is a schematic diagram of an exemplary storage system having a plurality of storage modules.

As described above, the present document addresses the provision of a storage system for a vehicle, which can be charged with relatively high charging capacities. In this regard, FIG. 1 shows a storage system 100 having N storage modules 111, 112 for the storage of electrical energy, which can be mutually connected in series or in parallel by way of a changeover unit 130 (wherein N is a whole (even) number, such that N>1, and specifically N=2). A storage module 111, 112 includes one or more storage cells or strings of storage cells.

The energy storage system 100 can be operated in two different modes, a "drive" mode, or drive mode, and a "charging" mode, or charging mode. FIG. 1 represents the "charging" operating mode. In this case, the series circuit connection of the storage modules 111, 112 is connected between the two poles 102, 105 to a charging socket of the vehicle, in order to charge the storage system 100 with an increased charging voltage. In the example represented, the changeover matrix 130 comprises a break contact 132 and a changeover switch 131. In charging mode, the break contact 132 is opened and the changeover switch 131 (as illustrated) is switched such that the negative pole of the first storage module 111 is connected to the positive pole of the second storage module 112.

By the closing of the break contact 132, and by the changeover of the changeover switch 131, such that the negative pole of the first storage module 111 is connected to the negative pole of the second storage module 112, the storage modules 111, 112 can be connected in parallel. In consequence, a reduced drive voltage is present between the poles 102, 105, wherein the drive voltage typically corresponds to one Nth of the charging voltage. The changeover of the switches 131, 132 in the changeover matrix 130 can be actuated by a control unit 105 of the storage system 100.

For various reasons, it can occur that, at the end of a charging process, the states of charge of the storage modules 111, 112 of the storage system 100 are different. For example, the storage modules 111, 112 can be loaded to differing extents during the charging process (e.g. by a low-voltage DC voltage converter 103 and the low-voltage (e.g. 12 V) on-board network 104 connected thereto). Moreover, the storage modules 111, 112 (e.g. on the grounds of variation in ageing) can have different internal resistances.

As a result of differences in states of charge, (possibly substantial) compensating currents can occur when the storage modules 111, 112 execute the transition from series connection to parallel connection. Compensating currents of this type can result in damage to the storage system 100. Consequently, the storage system 100 can incorporate measures for the prevention, or at least the reduction of compensating currents.

The storage system 100 can, for example, incorporate dedicated cooling modules 121, 122 for the cooling of the individual storage modules 111, 112. Specifically, the storage system 100 can have a first cooling module 121 for the cooling of the first storage module 111, and a second cooling module 122 for the cooling of the second storage module 112. The respective cooling modules 121, 122 are thus supplied with electrical energy from the respective storage modules 111, 112. Specifically, the first cooling module 121 is supplied with electrical energy from the first storage module 111, and the second cooling module 122 is supplied with electrical energy from the second storage module 112. The cooling modules 121, 122 can be employed as electrical loads, in order to adjust the state of charge of the respective storage module 111, 112.

The control unit 105 can be designed, during a charging process, to determine the state of charge of the individual storage modules 111, 112. For example, from an initial state of charge of a storage module 111, 112 at the start of a charging process, and from the cumulative charging capacity during the charging process, the control unit 105 can estimate the state of charge at a specific time point. Alternatively or additionally, a storage module 111, 112 can be disconnected at a specific time point, in order to explicitly measure the state of charge of the storage module 111, 112. To this end, specifically, the no-load voltage of the storage module 111, 112 can be measured.

Thus, where applicable, an imbalance of the states of charge of the first storage module 111 and of the second storage module 112 can be detected. The cooling modules 121, 122 can then be operated as electrical loads on the respective storage module 111, 112, in order to reduce the imbalance. For example, the first cooling module 111 can be operated with a higher electrical consumption than the second cooling module 112, if it is determined that the state of charge of the first storage module 111 is higher than the state of charge of the second storage module 112.

State of charge-dependent operation of the cooling modules 121, 122 (and/or another state of charge balancing measure) can already be implemented at an earlier time point in the charging process. For example, on the basis of historic data, it can be established that the first storage module 111 typically takes up a higher charging capacity than the second storage module 112. On the basis of this information, the first cooling module 121 can then be operated with a relatively high consumption (in comparison with the second cooling module 122) immediately from the outset, or a state of charge balancing measure can be executed immediately from the outset.

By means of the uneven operation of the cooling modules 121, 122, it can be achieved that the states of charge of the storage modules 111, 112 at the end of a charging process are brought closer, or are substantially equal. Consequently, any compensating currents associated with the subsequent parallel connection in drive mode are reduced or prevented.

Uneven operation of the cooling modules 121, 122 is typically associated with correspondingly uneven cooling requirements for the storage modules 111, 112 (on the grounds of uneven power take-up). Uneven operation of the cooling modules 121, 122 thus constitutes an energy-efficient option for the reduction of compensating currents.

Figure 2:
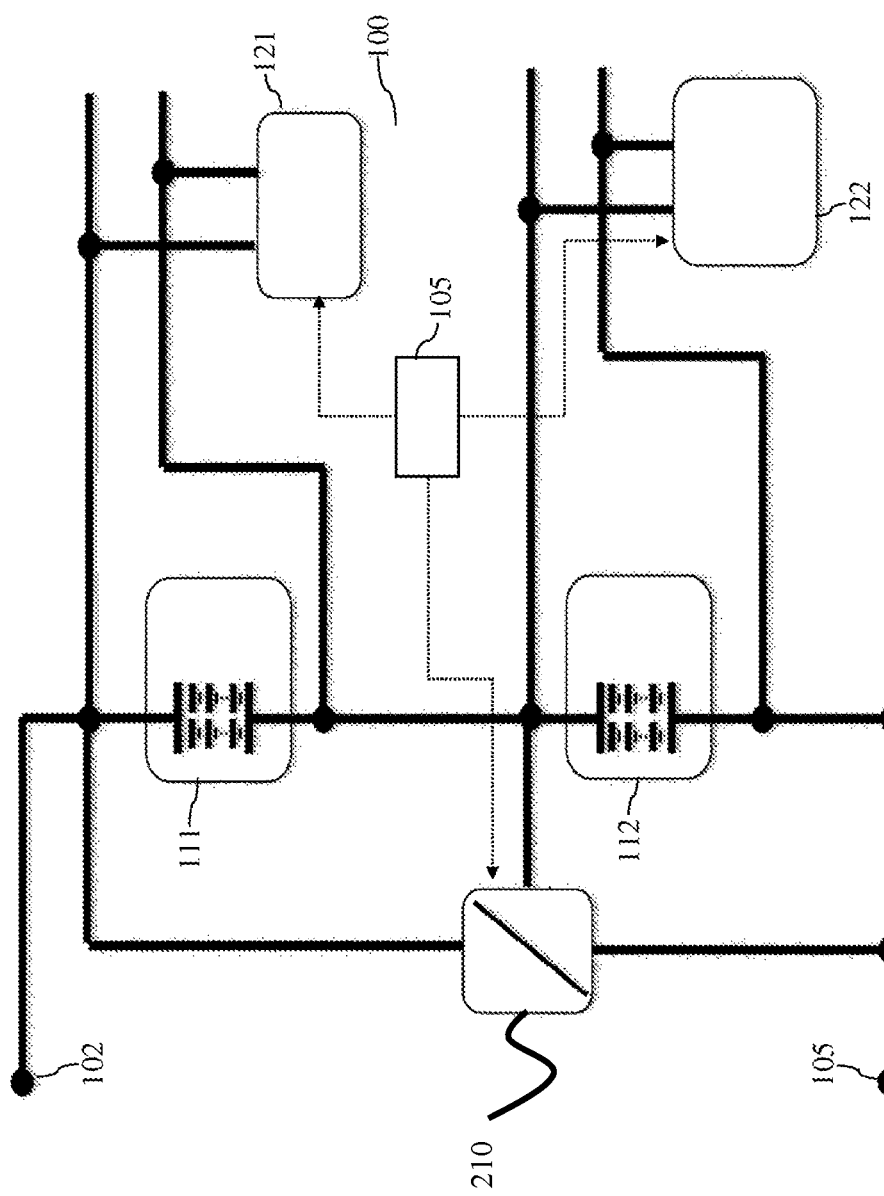
FIG. 2 is a schematic diagram of exemplary measures for the avoidance of compensating currents.

FIG. 2 shows a storage system 100 having a DC voltage converter 210, which is designed to transmit electrical energy from the first storage module 111 to the second storage module 112, and vice versa. The control unit 105 can be designed to actuate the DC voltage converter 210, such that a transfer of electrical energy between the storage modules 111, 112 is executed, thereby balancing the states of charge of the storage modules 111, 112. Consequently, compensating currents associated with the changeover to the parallel operation of the storage modules 111, 112 can be reduced.

For the balancing of states of charge, subsequently to a first phase of the charging process, during which the series circuit connection of the storage modules 111, 112 is charged, a partial fraction of the storage modules 111, 112 (e.g. only the first or only the second storage module) is charged in a second phase of the charging process (with a correspondingly reduced charging voltage), in order to balance the states of charge of the storage modules 111, 112. For example, in the second phase, dedicated recharging of the second storage module 112 can be executed, if it has been determined that the state of charge of the second storage module 112 is lower than the state of charge of the first storage module 111. It can thus be ensured that, upon a subsequent parallel connection of the storage modules 111, 112, no compensating current, or only a reduced compensating current flows.

As a further measure for the reduction of compensating currents, the storage modules 111, 112, subsequently to a charging process, can be progressively connected (i.e. only gradually) in parallel with the drive system of the vehicle. Specifically, in a first step, the storage module 111 with the highest state of charge can be connected in parallel with the drive system, in order to propel the vehicle (e.g. the first storage module 111). The one or plurality of other storage modules 112 can then initially remain disconnected from the drive system. Once the state of charge of the first storage module 111 has been reduced, the one or plurality of other storage modules 112 can then be connected in parallel with the drive system. This switching process is preferably executed at a time point at which the drive system is in zero power mode (e.g. during a coasting phase of the vehicle). By a progressive parallel connection of the storage modules 111, 112 in drive mode, compensating currents can be reduced in an energy-efficient manner.

Figure 3:
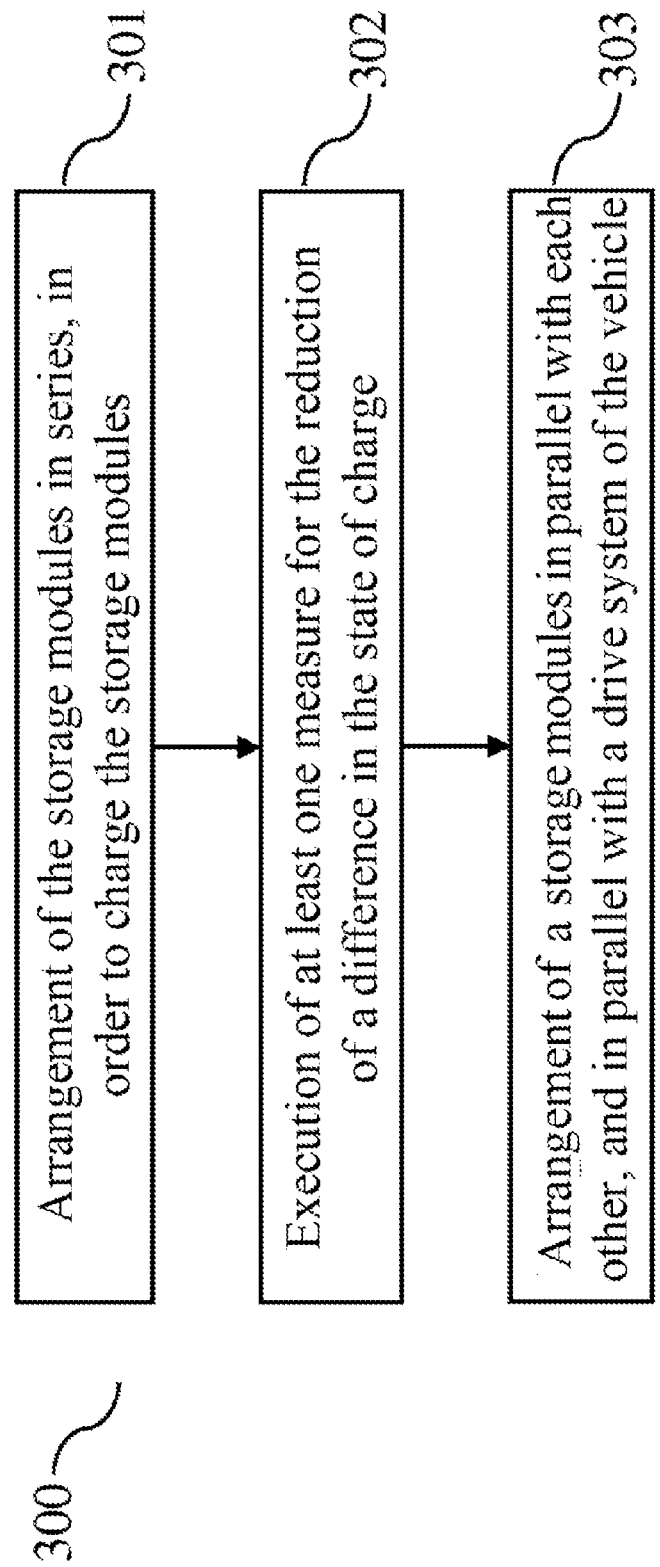
FIG. 3 is a flow diagram for an exemplary method for operating a storage system.

FIG. 3 shows a flow diagram for an exemplary method 300 for the protection of a storage system 100 of a vehicle, wherein the storage system 100 includes a first and a second storage module 111, 112 for the storage of electrical energy. The method 300 includes the arrangement 301 of the first storage module 111 and the second storage module 112 in series, in order to charge the first storage module 111 and the second storage module 112. The method 300 further includes, in preparation for a parallel connection of the first storage module 111 and the second storage module 112, the execution 302 of one or more (state of charge balancing) measures, in order to reduce any difference of the states of charge of the first storage module 111 and of the second storage module 112. Specifically, one or a plurality of measures can be executed in order to reduce the difference in the state of charge at least to a specific differential threshold value.

The method 300 further includes the mutually parallel arrangement 303 of the first storage module 111 and the second storage module 112, in order to supply a drive system of the vehicle with electrical energy. By the means of the previous reduction of the difference in the state of charge, it can be ensured that this parallel connection is executed in a secure manner (specifically, with no significant compensating currents).

By way of the measures described in the present document, a storage system for a vehicle can be provided that can switch between a relatively high charging voltage (for high charging capacities) and a relatively low drive voltage (for a cost-effective drive system) in a reliable manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage system for providing electric power for propulsion of a vehicle, the storage system comprising:
 a first and a second storage module for storage of electrical energy;
 a switch, which is configured to connect the first storage module and the second storage module in series for execution of a charging process, and in parallel for propulsion of the vehicle; and
 an electronic control unit configured to:
  implement one or more measures in order to reduce a difference of a state of charge of the first storage module and a state of charge of the second storage module, in preparation for the parallel connection of the first storage module to the second storage module;
  determine a switching time point, at which the power take-up of the drive system of the vehicle from the storage system is lower than or equal to a predefined power threshold value; and
  cause the switch, to arrange the second storage module, at the switching time point, in parallel with the drive system.

2. The storage system as claimed in claim 1, wherein
the storage system comprises a first cooling module and a second cooling module;
the first cooling module is operated by electrical energy from the first storage module;
the second cooling module is operated by electrical energy from the second storage module; and
the electronic control unit is configured to adjust an electrical consumption of the first cooling module and of the second cooling module, such that the difference between the state of charge of the first storage module and the state of charge of the second storage module is reduced.

3. The storage system as claimed in claim 1, wherein
the storage system comprises a DC voltage converter, which is configured to move electrical energy between the first storage module and the second storage module; and
the electronic control unit is configured to actuate the DC voltage converter such that the difference between the state of charge of the first storage module and the state of charge of the second storage module is reduced.

4. The storage system as claimed in claim 1, wherein the electronic control unit is configured to:
actuate the switch such that, in a first phase of a charging process, the series-connected first storage module and the second storage module are arranged in parallel with a charging socket of the vehicle; and
actuate the switch such that, in a subsequent second phase of the charging process, the first storage module is disconnected from the charging socket of the vehicle, and the second storage module is arranged in parallel with the charging socket of the vehicle.

5. The storage system as claimed in claim 4, wherein
during the subsequent second phase of the charging process, the state of charge of the second storage module is increased such that the difference in the state of charge to the first storage module is reduced.

6. The storage system as claimed in claim 1, wherein the electronic control unit is configured to:
determine information with regard to the state of charge of the first storage module and with regard to the state of charge of the second storage module; and
implement one or more measures, in accordance with information regarding the states of charge.

7. The storage system as claimed in claim 6, wherein the electronic control unit is configured to:
determine information with regard to the states of charge by the measurement of a voltage on the first storage module and/or on the second storage module; and/or
determine information with regard to the states of charge by the measurement of the cumulative charging capacities of the first storage module and/or of the second storage module over time.

8. The storage system as claimed in claim 1, wherein
the first storage module and the second storage module have a substantially equal rated voltage.

9. The storage system as claimed in claim 1, wherein
the state of charge of the first storage module is reduced during the first phase such that, upon subsequent parallel connection of the second storage module, no compensating current or only a reduced compensating current flows between the first storage module and the second storage module.

10. A method for protecting a storage system of a vehicle, wherein the storage system comprises a first and a second storage module for storage of electrical energy, the method comprising the steps of:
arranging the first storage module and the second storage module in series, in order to charge the first storage module and the second storage module;
in preparation for a parallel connection of the first storage module and the second storage module, executing one or more measures for reducing a difference of the states of charge of the first storage module and of the second storage module;
mutually parallel arranging of the first storage module and the second storage module, in order to supply electrical energy to a drive system of the vehicle;
determining a switching time point, at which the power take-up of the drive system of the vehicle from the storage system is lower than or equal to a predefined power threshold value; and
arranging the second storage module, at the switching time point, in parallel with the drive system.

11. The method as claimed in claim 10, wherein the method further comprises the steps of:
determining historic data which indicate a difference of the states of charge of the first storage module and of the second storage module in the course of one or more previous charging processes of the first and second storage modules; and
selecting one or more measures, in accordance with the historic data.

* * * * *